United States Patent [19]
Zavis

[11] Patent Number: 5,940,257
[45] Date of Patent: Aug. 17, 1999

[54] METHOD AND APPARATUS FOR ALTERNATING CURRENT MONITORING WITH PHASE AND MAGNITUDE MEASUREMENT

[75] Inventor: Wayne Zavis, Cary, N.C.

[73] Assignee: Siemens Energy & Automation, Inc., Alpharetta, Ga.

[21] Appl. No.: 08/536,017

[22] Filed: Sep. 29, 1995

[51] Int. Cl.$^6$ ....................................................... H02H 3/00
[52] U.S. Cl. ................................ 361/42; 361/93; 361/115
[58] Field of Search ................................. 361/42, 45, 47, 361/115, 93

[56] References Cited

U.S. PATENT DOCUMENTS 4,001,646  1/1977  Howell ..................................... 361/42
4,347,540  8/1982  Gary .......................................... 361/42

Primary Examiner—Jeffrey A. Gaffin
Assistant Examiner—Stephen Jackson

[57] ABSTRACT

A method and apparatus for monitoring multi-phase alternating current signals and providing a signal representative of each phase current signal. Each alternating current signal is rectified by a direct current output rectifier to generate a signal representative of both the phase and magnitude of the alternating current signal. The method and apparatus also provides for using the output signal to operate a circuit breaker in a ground fault detection system.

7 Claims, 3 Drawing Sheets

METHOD AND APPARATUS FOR ALTERNATING CURRENT MONITORING WITH PHASE AND MAGNITUDE MEASUREMENT

FIELD OF THE INVENTION

The present invention relates to current measurement and signal monitoring. In particular, the present invention relates to an improved current measuring circuit which retains both phase and magnitude information of a signal representative of an alternating current being measured after direct current rectification of the signal. More particularly, the present invention relates to a current measuring circuit used in a multi-phase power alternating current distribution system to monitor and detect ground fault conditions in order to more accurately operate a circuit breaker.

BACKGROUND OF THE INVENTION

Current measuring circuits have many applications and, in particular, one such application is in a trip unit for a circuit breaker providing ground fault protection. U.S. Pat. No. 4,631,625, issued on Dec. 23, 1986, discloses a microprocessor-based trip unit for a circuit breaker within which a current measuring circuit is incorporated. In U.S. Pat. No. 4,631,625 the current measuring circuit is generally illustrated as including current transformers, a rectifier, signal converters and an analog inverter. The microcomputer of U.S. Pat. No. 4,631,625 ultimately utilizes the signals from the analog inverter to calculate a ground fault current. U.S. Pat. No. 4,947,126, issued on Aug. 7, 1990, also discloses a ground fault protection circuit for monitoring multi-phase alternating current signals and for providing a set of positive (full wave rectified, direct current) signals each associated with the alternating current signals being monitored.

Some ground fault protection schemes modify signals representative of the alternating current being measured in such a way that neither the phase nor the polarity information of these signals is preserved. A Root Mean Square (RMS) analysis of these signals is then performed without the polarity information in order to calculate a ground fault current. U.S. Pat. No. 4,927,126 discloses an improved apparatus for monitoring an alternating current signal that preserves the collective polarity information of the current signal, partly improving the accuracy of ground fault current calculations. However, the apparatus does not independently recover phase information for each phase of a multi-phase alternating current signal being monitored.

Accordingly, it would be advantageous to develop a further improved current measuring circuit for an alternating current signal that allows the subsequent complete and independent reconstruction of the signal with the same fidelity of the original signal (i.e. with phase and polarity information as well as magnitude information preserved), to improve the accuracy of ground fault current calculations or other calculations relying upon the reconstructed signal.

SUMMARY OF THE INVENTION

The present invention relates to an apparatus for detecting a ground fault in an electrical signal distribution system distributing a load current carried by at least one conductor coupling a multi-phase power source to an electrical load. The apparatus includes a current transformer coupled to the conductor to generate an alternating current signal representative of the load current, a current measuring circuit coupled to the current transformer to generate a voltage sense signal representative of the alternating current signal, a controller coupled to the current measuring circuit to detect a ground fault based on the voltage sense signal and to generate a control signal representative of a ground fault current, and a circuit breaker coupled between the power source and the electrical load and actuated by the control signal to prevent distribution of the load current upon detection of the ground fault.

The present invention also relates to an apparatus for measuring a signal representative of an electrical signal generated at a current transformer having a positive terminal and a negative terminal. The apparatus includes a split bridge rectifier wherein the positive terminal of the current transformer is coupled to a first terminal of the split bridge rectifier and the negative terminal of the current transformer is coupled to a third terminal of the split bridge rectifier, and an amplifier circuit coupled at a first input terminal to the fourth terminal of the split bridge rectifier and at the second input terminal to the fifth terminal of the split bridge rectifier to provide an offset bipolar signal at the output terminal representative of a signal present at the first terminal of the split bridge rectifier.

The present invention also relates to an apparatus for measuring a signal representative of an electrical signal generated at a current transformer having a positive terminal and a negative terminal. The apparatus includes a phased bridge rectifier wherein the positive terminal of the current transformer is coupled to a first terminal of the phased bridge rectifier and the negative terminal of the current transformer is coupled to a third terminal of the phased bridge rectifier, and a comparator circuit coupled at a first input terminal to the first terminal of the phased bridge rectifier and at a second input terminal to the fourth terminal of the phased bridge rectifier to provide a polarity sense signal at the output terminal representative of the polarity of a signal present at the first terminal of the rectifier.

The present invention also relates to an apparatus for measuring a signal representative of an electrical signal generated at a current transformer. The apparatus includes rectifying means coupled to the current transformer for effecting half wave rectification of the electrical signal and amplifying means coupled to the rectifying means for providing an offset bipolar signal at an output terminal representative of the electrical signal present at the current transformer.

The present invention also relates to an apparatus for measuring a signal representative of an electrical signal generated at a current transformer. The apparatus includes rectifying means coupled to the current transformer for effecting full wave rectification of the electrical signal, comparator means coupled to the rectifying means for providing a polarity sense signal representative of the polarity of the electrical signal generated at the current transformer and means coupled to the rectifying means for providing a full wave rectified signal representative of the electrical signal generated at the current transformer.

The present invention also relates to a method of monitoring ground faults in a multi-phase electrical signal distribution system distributing a load current to an electrical load. The method includes the steps of generating a first signal having a phase and a magnitude representative of the multi-phase electrical signal, rectifying the first signal to generate a second signal representative of both the phase and the magnitude of the first signal, supplying the second signal to a controller to detect a ground fault condition and to generate a control signal, and supplying the control signal to a trip mechanism to activate a circuit breaker upon detection of a ground fault condition.

The preferred embodiments of the present invention are explained below in further detail with reference to the accompanying drawings.

DETAILED DESCRIPTION OF THE PREFERRED EMBODIMENT

Figure 1:
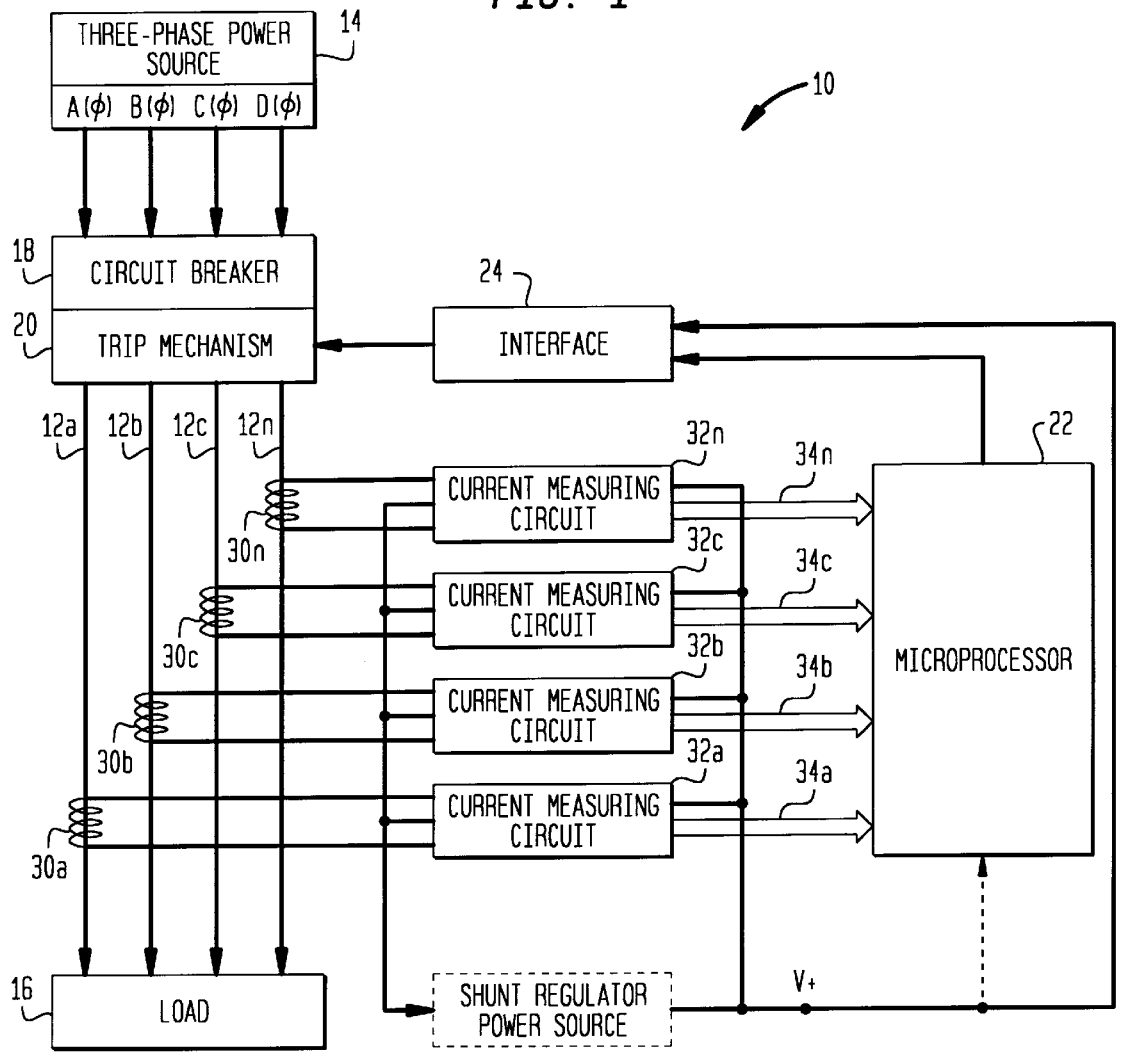
FIG. 1 is a schematic illustration of a three-phase alternating current power distribution circuit with a signal monitoring circuit.

Referring now to the figures, FIG. 1 illustrates a three-phase alternating current distribution circuit 10, providing alternating load currents in three phases (AΦ, BΦ, and CΦ) and their associated neutral (NΦ) along electrical conductors shown as lines 12a, 12b, 12c, and 12n, respectively. Three-phase alternating current distribution circuit 10 includes a three-phase power source 14, distributing load currents in their respective phases to electrical equipment represented by electrical load 16. Between load 16 and power source 14 is a circuit breaker 18, which includes a trip mechanism 20 connected to a controller such as microprocessor 22 by an interface circuit 24.

Alternating current signals distributed from three-phase power source 14 to load 16 for each of the three phases (AΦ, BΦ, and CΦ) and their associated neutral (NΦ) are monitored by a series of current transformers 30a, 30b, 30c, and 30n, respectively. In the preferred embodiment, current transformers 30a, 30b, 30c, and 30n are used to provide signals representative of the currents in lines 12a, 12b, 12c and 12n, respectively. By way of example, these currents can alternate between a positive voltage range and a negative voltage range at a frequency of 60 cycles per second. In addition, the currents in lines 12a, 12b, and 12c can be out of phase by 120°.

The signals generated at each of current transformers 30a, 30b, 30c, and 30n are supplied to a corresponding series of current measuring circuits, shown schematically in FIG. 1 at 32a, 32b, 32c, and 32n, respectively, for suitable rectification (i.e. alternating current to direct current conversion). The output signal from each of current measuring circuits 32a, 32b, 32c, and 32n is supplied along a suitable conductor such as data bus 34 to microprocessor 22 along lines 34a, 34b, 34c, and 34n, respectively. Based on calculations at microprocessor 22 a control signal is delivered to circuit breaker 18 through interface circuit 24 (well known to those of ordinary skill in the art), which converts the control signal from microprocessor 22 into an appropriate format for suitable operation of circuit breaker 18 and its associated trip unit 20.

Figure 2:
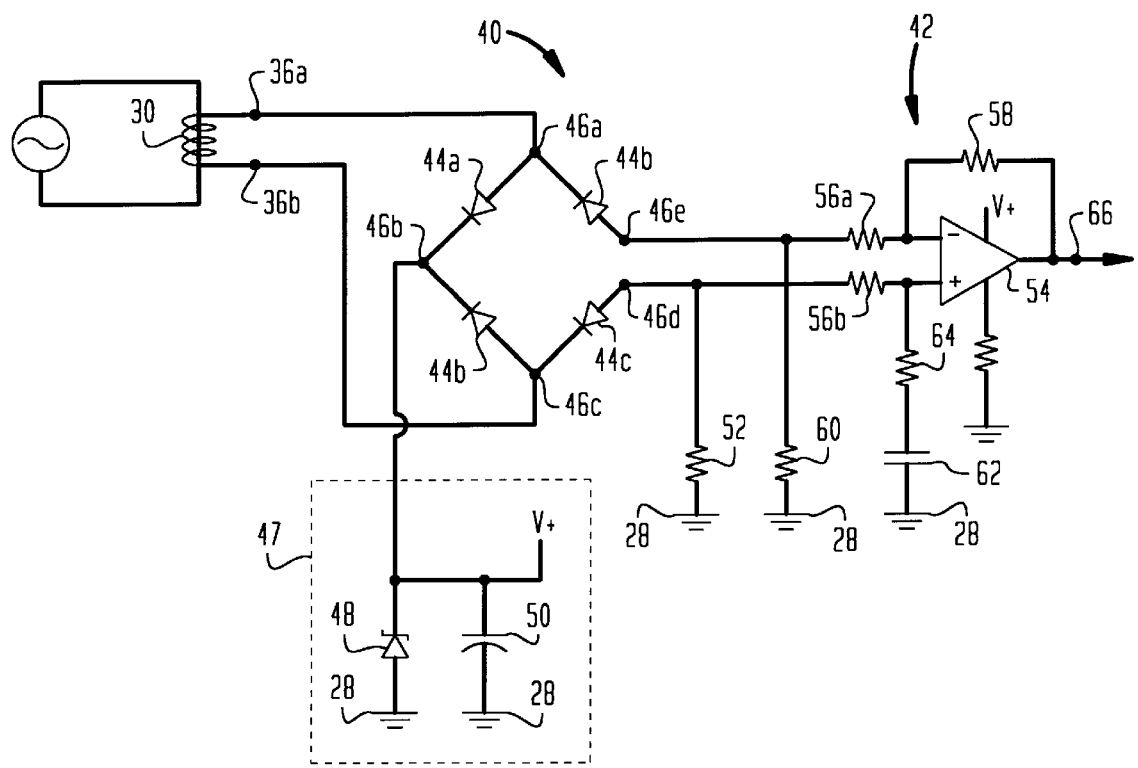
FIG. 2 is a schematic illustration of a split bridge circuit for monitoring an alternating current signal.

One particularly preferred exemplary embodiment of each of current measuring circuits 32a, 32b, 32c, and 32n is a split bridge circuit 40 as shown in FIG. 2. In this embodiment, the configuration of each of split bridge circuits represented at 32a, 32b, 32c, and 32n is identical (with the exception of the power source lead and related capacitor and shung regulator 50, 48 respectively, all of which are contained within regulator box 47 and which is common for all measuring circuits. Therefore the respective exemplary embodiment shown in FIG. 2 need be described only once.

Split bridge circuit 40 provides half-wave rectification for the alternating current signal supplied by each current transformer 30a, 30b, 30c, and 30n, using an operational amplifier circuit 42, configured to operate as a difference amplifier well known in the art, and a split bridge of a general type disclosed in U.S. Pat. No. 4,947,126, which is incorporated by reference herein. Split bridge circuit 40 basically performs dual half-wave rectification (within split bridge 41) of the alternating current signal generated by current transformer 30 thereby retaining the polarity and fidelity of the composite signal (representative of the alternating current signal) ultimately provided in the form of an offset bipolar signal at the output terminal 66 of operational amplifier circuit 42.

Split bridge 41 is a rectifier that includes four diodes 44a, 44b, 44c, and 44d along with five terminals 46a, 46b, 46c, 46d, and 46e, in the configuration shown in FIG. 2. (Any equivalent configuration may accomplish the same function.) Diode 44a allows current to flow in the direction from terminal 46a to terminal 46b, only. Diode 44c allows current to flow in the direction from terminal 46d to terminal 46c, only. Diode 44b allows current to flow in the direction from terminal 46c to terminal 46b, only. Diode 44d allows current to flow in the direction from terminal 46e to terminal 46a, only.

Each current transformer 30 (shown as typical in FIG. 2) includes two terminals 36a and 36b. Terminals 36a and 36b of current transformer 30 are electrically connected to terminals 46a and 46c of split bridge 41, respectively, as shown in FIG. 2. Terminal 46b of split bridge 41 is electrically connected to a power supply shown in box 47, shown in the exemplary embodiment as including a zener diode 48 and a capacitor 50, and to a common ground 28.

Terminal 46d of split bridge 41 is electrically connected to common ground 28 through a first burden resistor 52. Terminal 46d is also connected to the non-inverting input of operational amplifier 54 through an input resistor 56b. The operational amplifier circuit 42 also includes a feedback resistor 58 coupled between the inverting input and output of operational amplifier 54. Terminal 46e of split bridge 41 is electrically connected to common ground 28 through a second burden resistor 60. Terminal 46e is also connected to the inverting input of operational amplifier 54 via resistor 56a. The operational amplifier circuit 42 further includes a biasing direct current reference voltage source 62 and biasing resistor 64 connected in series between the non-inverting input of operational amplifier 54 and common ground 28.

When the alternating current signal generated by current transformer 30 is positive (with respect to the common ground voltage level), there is a positive voltage present at terminal 36a of current transformer 30 and accordingly a positive voltage present at terminal 46a of split bridge 41. Correspondingly, there is a negative voltage present at terminal 36b of current transformer 30 and accordingly at terminal 46c of split bridge 41.

Current thus flows in a closed loop from terminal 36a of current transformer 30 to terminal 46a of split bridge 41 across diode 44a to terminal 46b of split bridge 41, across zener diode 48 to common ground 28, through common ground 28 across first burden resistor 52 to terminal 46d of split bridge 41 across diode 44c to terminal 46c of split bridge 41 and to terminal 36b of current transformer 30. Because diode 44d blocks current flow between and in the direction from terminal 46e to terminal 46a in split bridge 41, no current is drawn through common ground 28 across second burden resistor 60. (Diodes 44b and 44d block current flow between and in the direction from terminal 46c to terminal 46b and from terminal 46e to terminal 46a, respectively, within split bridge 41.) A nominally zero reference voltage signal representative of the voltage at common ground 28 is present at terminal 46e of split bridge 41 and is provided (across an input resistor 56a) to the inverting input of operational amplifier 54. A voltage signal representative of the negative voltage at terminal 46d of split bridge 41 is provided (across an input resistor 56b) to the non-inverting input of operational amplifier 54, which results in a positive signal at output terminal 66 of operational amplifier circuit 42 representative of the voltage difference at the respective inverting and non-inverting inputs of operational amplifier 54.

When the alternating current signal generated by current transformer 30 is negative (with respect to the common ground), there is a negative voltage present at terminal 36a of current transformer 30 and accordingly a negative voltage present at terminal 46a of split bridge 41. Correspondingly, there is a positive voltage present at terminal 36b of current transformer 30 and accordingly at terminal 46c of split bridge 41.

Current therefore flows in a closed loop from terminal 36b of current transformer 30 to terminal 46c of split bridge 41 across diode 44b to terminal 46b of split bridge 41, across zener diode 48 to common ground 28, through common ground 28 across second burden resistor 60 to terminal 46e of split bridge 41 across diode 44d to terminal 44a of split bridge 41 and to terminal 36a of current transformer 30. Because diode 44c blocks current flow between and in the direction from terminal 44d to terminal 44c in split bridge 41, no current is drawn through common ground 28 across first burden resistor 52. (Diodes 44a and 44c block current flow between and in the direction from terminal 44b to terminal 44a and from terminal 44c to terminal 44d, respectively, within split bridge 41.) A negative voltage signal representative of the current signal from terminal 36a is present at terminal 46e of split bridge 41 and is provided (across input resistor 56a) to the inverting input of operational amplifier 54. A nominally zero reference voltage from common ground 28 is present on the non-inverting input of operational amplifier 54, which results in a positive signal at output terminal 66 of operational amplifier circuit 42 representative of the voltage difference at the inverting and non-inverting inputs of operational amplifier 54.

The output of operational amplifier circuit 42 is in the form of an offset bipolar signal (in distinction from a nominally zero- or ground-biased signal). As shown in FIG. 2, the output of operational amplifier circuit 42 can be biased (i.e. adjusted) with reference to voltage reference source 62. (In the event that a reference voltage is not provided, the offset bipolar output of operational amplifier circuit is a nominally zero-biased signal.) In a particularly preferred embodiment, the output is biased about the center of the full-scale input voltage range of an analog-to-digital converter (not shown) coupled between output terminal 66 of operational amplifier circuit 42 and microprocessor 22 (shown in FIG. 1).

The signal provided at output terminal 66 of operational amplifier circuit 42 is supplied to microprocessor 22 (which may first include an analog-to-digital converter) along each line of bus 34 (as shown in FIG. 1) for purposes of further analysis and decision-making by microprocessor 22. Returning to FIG. 1, each current measuring circuit 32a, 32b, 32c and 32n (more particularly represented by split bridge circuit 40) provides to microprocessor 22 an independent signal representative of each of the alternating current signals distributed from three-phase power source 14 for each of the three phases (AΦ, BΦ, and CΦ) and their associated neutral (NΦ). Moreover, the fidelity (i.e. phase and magnitude) of each of the independent signals is preserved. As a result of this enhanced fidelity of the signals, microprocessor 22 (or any alternative processing device) would have the capability of calculating more accurately both ground fault currents and power consumption (or any other quantity that would benefit from more complete information respecting signal fidelity).

In an exemplary embodiment, feedback resistor 58 has a value of 11k ohms. First burden resistor 52 and second burden resistor 60 each have values of 0.1 ohms, respectively. Reference voltage source 62 supplies a voltage signal in a range of +2.5 volts. Input resistors 56a and 56b each have a value of 2.0k ohms. Biasing resistor 64 has a value of 11k ohms. This exemplary embodiment provides an offset bipolar output voltage signal at output terminal 66 of operational amplifier 54 with a peak voltage range of +/−2.5 volts around a +2.5 volt bias. This exemplary embodiment requires the use of precision (or "notched") components.

In the particularly preferred embodiment shown in FIG. 2, split bridge circuit 40 is self-powered meaning that the energy needed to operate the signal processing circuitry and preferably all other circuitry (e.g. operational amplifier 54, microprocessor and other associated devices) is obtained from current transformer 30. In this fashion, the requirement for a self powered low voltage trip device such as in circuit breakers (i.e., smart, adjustable fuses) is satisfied.

Figure 3:
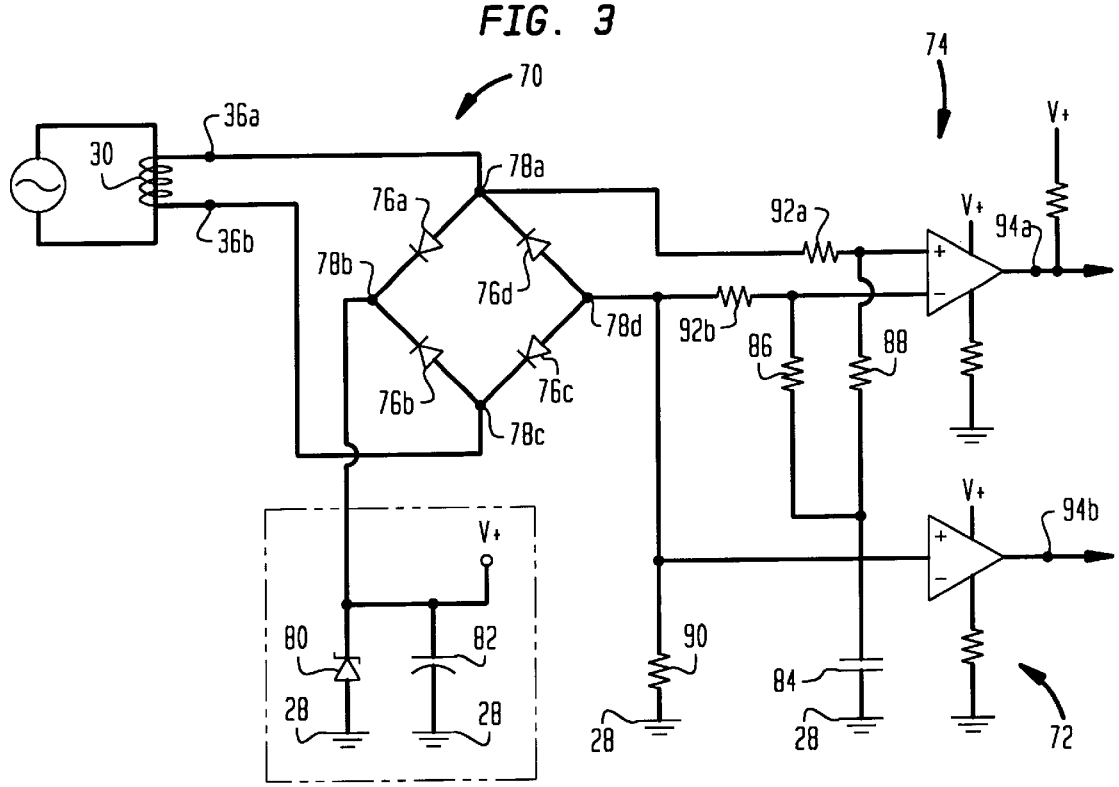
FIG. 3 is a schematic illustration of a phased bridge circuit for monitoring an alternating current signal.

Another particularly preferred exemplary embodiment of each of current measuring circuits 32a, 32b, 32c, and 32n is a phased bridge circuit 70 as shown in FIG. 3. In this embodiment the configuration of each, with the exception of the aforementioned common power elements, of phased bridge circuits represented by 32a, 32b, 32c, and 32n is identical; therefore the respective exemplary embodiment shown in FIG. 3 need be described only once.

Phased bridge circuit 70 provides full wave rectification for the alternating current signal supplied by each current transformer 30a, 30b, 30c, and 30n using a linear gain amplifier circuit 72, employing a conventional operational amplifier as is well known in the art, along with a comparator circuit 74. Phased bridge circuit 70 basically performs full wave rectification (within phased bridge 71) of the alternating current signal generated by current transformer 30 thereby providing a voltage magnitude signal (representative of the alternating current signal) at the output terminal 94b of linear gain amplifier circuit 72 while also providing a voltage polarity signal (also representative of the alternating current signal) at the output terminal 94a of comparator circuit 74.

Phased bridge 71 is a rectifier that includes four diodes 76a, 76b, 76c, and 76d along with four terminals 78a, 78b, 78c, and 78d in the configuration shown in FIG. 3. (Any equivalent configuration may accomplish the same function.) Diode 76a allows current to flow in the direction from terminal 78a to terminal 78b, only. Diode 76b allows current to flow in the direction from terminal 78c to terminal 78b, only. Diode 76c allows current to flow in the direction from terminal 78d to terminal 78c, only. Diode 76d allows current to flow in the direction from terminal 78d to terminal 78a, only.

Each current transformer 30 (typical) includes two terminals 36a and 36b. Terminals 36a and 36b of current transformer 30 are electrically connected to terminals 78a and 78c of phased bridge 71, respectively, as shown in FIG. 3. Terminal 78a of phased bridge 71 is also electrically connected across an input resistor 92a to the non-inverting input of comparator circuit 74. Terminal 78b of phased bridge 71 is electrically connected to a power supply, shown in the exemplary embodiment as including a zener diode 80 and a capacitor 82, and to a common ground 28.

Terminal 78d of phased bridge 71 is electrically connected to common ground 28 through a burden resistor 90. Terminal 78d is also connected both to the input (inverting input) of a linear gain amplifier circuit 72 and to the inverting input of comparator circuit 74. Terminal 78d of phased bridge 71 is also electrically connected across an input resistor 92b to the inverting input of comparator circuit 74. Comparator circuit 74 further includes a biasing direct current reference voltage source 84 connected in series with first biasing resistor 86 between the non-inverting input of comparator circuit 74 and common ground 28 and with second biasing resistor 88 between the inverting input of comparator circuit 74 and common ground 28.

When the alternating current signal generated by current transformer 30 is positive (with respect to the common ground voltage level), there is a positive voltage present at terminal 36a of current transformer 30 and accordingly a positive voltage present at terminal 78a of phased bridge 71. Correspondingly, there is a negative voltage present at terminal 36b of current transformer 30 and accordingly at terminal 78c of phased bridge 71.

Current flows in a closed loop from terminal 36a of current transformer 30 to terminal 78a of phased bridge 71 across diode 76a to terminal 78b of phased bridge 71, across zener diode 80 to common ground 28, through common ground 28 across burden resistor 90 to terminal 78d of phased bridge 71 across diode 76c to terminal 78c of phased bridge 71 and to terminal 36b of current transformer 30. (Diodes 76b and 76d block current flow between and in the direction from terminal 78b to terminal 78c and from terminal 78d to terminal 78a, respectively, within phased bridge 71). A negative voltage signal (representative of the current from terminal 36a) is present at terminal 78d of phased bridge 71 and is provided to the input of linear gain amplifier circuit 72.

The voltage present at terminal 78d of phased bridge 71 is also (across an input resistor 92b) present at the inverting input of comparator circuit 74. The voltage present at terminal 78a of phased bridge 71 is (across an input resistor 92a) present at the noninverting input of comparator circuit 74. Because of voltage drops along the circuit path from terminal 78a back to terminal 78d of phased bridge 71, there is a voltage differential across diode 76d (across which no current flows), with a higher voltage present at terminal 78a than at terminal 78d. Accordingly, the signal at output terminal 94a of comparator circuit 74 is in a "high" (or non-zero) state.

When the alternating current signal generated by current transformer 30 is negative (with respect to the common ground), there is a negative voltage present at terminal 36a of current transformer 30 and accordingly a negative voltage present at terminal 78a of phased bridge 71. Correspondingly, there is a positive voltage present at terminal 36b of current transformer 30 and accordingly at terminal 78c of phased bridge 71.

Current flows in a closed loop from terminal 36b of current transformer 30 to terminal 78c of phased bridge 71 across diode 76b to terminal 78b of phased bridge 71, across zener diode 80 to common ground 28, through common ground 28 across burden resistor 90 to terminal 78d of phased bridge 71 across diode 76d to terminal 78a of phased bridge 71 and to terminal 36a of current transformer 30. (Diodes 76a and 76c block current flow between and in the direction from terminal 78b to terminal 78a and from terminal 78c to terminal 78d, respectively, within phased bridge 71.) Once again, a negative voltage signal (now representative of the current from terminal 36b) is present at terminal 78d of phased bridge 71 and is provided to the input of linear gain amplifier circuit 72.

The voltage present at terminal 78d of phased bridge 71 is also (across input resistor 92b) present at the inverting input of comparator circuit 74. Because current can flow across diode 78d, a negative voltage relative to 78d (across input resistor 92a) is present at terminal 78a of phased bridge 71 and therefore also at the non-inverting input of comparator circuit 74. Accordingly, output of comparator circuit 74 is in a "low" (or zero) state.

Phased bridge circuit 71 thereby operates comparator circuit 74 between two steady-state thresholds ("high" and "low"), dependent upon the polarity of the alternating current signal from current transformer 30. In conventional circuits employing such a comparator circuit, there may be transient instability (e.g. chatter) between comparator states at the zero-cross of the alternating current signal (i.e. when the polarity of the voltage signal shifts from negative to positive or from positive to negative). As shown in FIG. 3, when the alternating current signal from current transformer 30 is a negative polarity, the current flows through diode 76d and the voltage across terminals 78d and 78a of phased bridge 71 is negative from 78d to 78a. When the alternating current signal from current transformer 30 is a positive polarity, the positive voltage across diode 78d (i.e. between terminals 78d and 78a) of phased bridge 71 is nominally the zener voltage ($V_z$), the nominal voltage at which zener diode 80 regulates, even as the alternating current voltage signal crosses zero (on the way to a negative polarity). Because of this influence of the zener voltage ($V_z$), comparator circuit 74 demonstrates a "snapping" or hysteresis effect that reduces the sensitivity of comparator circuit 74 to noise at or near the zero-cross. In this manner, comparator circuit 74 provides a rapid, clean transition in comparator state (from low to high or from high to low as the case may be) and thereby provides a predictable and repeatable correlation between the polarity of the alternating current signal and the output of comparator circuit 74.

In an alternative embodiment (not shown) it would be possible to eliminate zener diode 80, in which case the voltage drop across terminals 78d and 78a would correspond only to the nominal forward voltage of diode 76d and 76a which are of opposite polarity from each other relative to 78a and 78d. However, if zener diode 80 is removed, the "snapping" or hysteresis effect it provides is reduced but not lost.

Phased bridge circuit 70 effects full wave rectification insofar as the current flow across burden resistor 90 is always in the same direction, and therefore the voltage at the input of linear gain amplifier circuit 72 is always of the same polarity regardless of the polarity of the alternating current signal from current transformer 30.

In an alternative embodiment (not shown) it would be possible to eliminate linear gain amplifier circuit 72 and measure the full wave rectified signal directly at burden resistor 90. However, linear gain amplifier circuit 72 provides beneficial inversion and scaling of the voltage present at its input. Therefore in the embodiment shown in FIG. 3, burden resistor 90 could be given a very low resistance value for purposes of power conservation (and heat reduction).

In the preferred embodiment, the output of linear gain amplifier circuit 72 is in the form of a full wave rectified signal. As shown in FIG. 3, the amplitude of the output signal of linear gain amplifier circuit 72 can be adjusted simply by adjusting the gain. In a particularly preferred embodiment, the output signal is adjusted to correspond to the full-scale input voltage range of an analog-to-digital converter (not shown) coupled between linear gain amplifier circuit 72 and microprocessor 22 (shown in FIG. 1). Because the phase (i.e. polarity) information of the alternating current signal is independently provided by comparator circuit 74, the output of linear gain amplifier circuit 72 is able to use the full resolution of the analog-to-digital converter. Moreover the frequency of the alternating current signal may be monitored, for example, by timing the rising edge to rising edge (i.e. frequency) of the output signal of output terminal 94a of comparator circuit 74.

The output signals from both the linear gain amplifier circuit 72 and comparator circuit 74 are then supplied to microprocessor 22 along each line of bus 34 (as shown in FIG. 1) for purposes of further analysis and decision-making by microprocessor 22. Returning to FIG. 1, each phased bridge circuit 70 provides to microprocessor an independent signal representative of each of the alternating current signals distributed from three-phase power source 14 for each of the three phases (AΦ, BΦ, and CΦ) and their associated neutral (NΦ). Moreover, the fidelity (i.e. phase and magnitude) of each of the independent signals is preserved. As a result of the fidelity of the signals, microprocessor 22 (or any alternative processing device) will have the ability to calculate more accurately both ground fault currents and power consumption (or any other quantity that would benefit from more complete information respecting signal fidelity, (i.e. phase power factor).

In an exemplary embodiment, input resistors 92a and 92b each have a value of 10k ohms. Burden resistor 90 has a value of 0.1 ohms. Reference voltage source 84 supplies direct current at +2.5 volts. Biasing resistors 86 and 88 each have a value of 10k ohms. Linear gain amplifier circuit has a gain of −11.0. This exemplary embodiment provides a full wave rectified output voltage signal at the output terminal 94b of linear gain amplifier circuit 72 in a peak voltage range of zero to 5 volts. The exemplary embodiment also provides a square wave signal at the output terminal 94a of comparator circuit 74 in a voltage range of zero to 5 volts (based on microprocessor input voltage requirements). This exemplary embodiment allows for use of standard components and tolerances.

In the particularly preferred embodiment shown in FIG. 3, phased bridge circuit 70 is self-powered meaning that the energy needed to operate the signal processing circuitry and preferably all other circuitry (e.g. comparator circuit 74, linear gain amplifier circuit 72 and other associated devices) is obtained from current transformer 30.

By way of example, the above-described current measuring circuits each may be used to operate a trip unit for a circuit breaker. (A trip unit of this general type is disclosed in U.S. Pat. No. 4,631,625, incorporated by reference herein.) As previously discussed, signals from current measuring circuit 32 can be supplied to a microprocessor of a trip unit. Based upon these signals, the microprocessor can supply a signal which causes the circuit breaker to trip when the signals fall outside of the predetermined limit.

While one preferred embodiment of a current measuring apparatus, including two alternative exemplary embodiments of a constituent current measuring circuit, has been shown and described in detail herein, various other changes and modifications may be made to adapt the assembly for use in various articles. For example, the specific configuration of the circuit could be modified to function with more or less than three phases of current. The phased and split (diode) bridges may be configured differently than shown in the preferred embodiments discussed herein to accomplish the same function and result. The apparatus could of course also be used with devices other than circuit breaker trip units. The apparatus could of course also be used with other circuit values, all consistent with the scope and spirit of the invention.

What is claimed is:

1. An apparatus for detecting a ground fault in an electrical signal distribution system distributing a load current carried by at least first and second conductors coupling a multi-phase power source to an electrical load, the apparatus comprising:

a first transformer coupled to the first conductor to generate a first alternating current signal representative of one phase of the load current;

a second transformer coupled to the second conductor to generate a second alternating current signal representative of another phase of the load current;

a first signal generating circuit coupled to the first transformer to generate a first voltage sense signal representative of the first alternating current signal;

a second signal generating circuit coupled to the second transformer to generate a second voltage sense signal representative of the second alternating current signal;

a controller coupled to the signal generating circuits to detect a ground fault based on the first and second voltage sense signals and to generate a control signal representative of a ground fault current; and a circuit breaker coupled between the power source and the electrical load and actuated by the control signal to prevent distribution of the load current upon detection of a ground fault.

2. The apparatus of claim 1 wherein the signal generating circuit further comprises a split bridge rectifier circuit.

3. The apparatus of claim 1 wherein the signal generating circuit further comprises a phased bridge rectifier circuit.

4. The apparatus of claim 1 wherein the first and second signal generating circuits generate the respective first and second voltage sense signals to each include a magnitude component and a phase component.

5. The apparatus of claim 1 wherein the first and second signal generating circuits generate the respective first and second voltage sense signals to each include a magnitude component.

6. The apparatus of claim 1 wherein the first and second signal generating circuits generate the respective first and second voltage sense signals to each include a phase component.

7. A method of monitoring ground faults in a multi-phase electrical signal distribution system for distributing at least first and second load currents to an electrical load, the method comprising the steps of:

generating a first signal representative of the first load current;

rectifying the first signal to generate a second signal representative of both the phase angle and the magnitude of the first signal;

supplying the second signal to a controller to detect a ground fault condition and to generate a control signal; and supplying the control signal to a trip mechanism to activate a circuit breaker upon detection of a ground fault condition.

* * * * *